United States Patent
Niewiadomski et al.

(10) Patent No.: US 11,124,234 B2
(45) Date of Patent: Sep. 21, 2021

(54) SHARED ACTIVATION BUTTON FOR TRAILER FEATURES

(71) Applicant: Ford Global Technologies, LLC, Dearborn, MI (US)

(72) Inventors: Luke Niewiadomski, Dearborn, MI (US); Donald Jacob Mattern, Canton, MI (US); Roger Arnold Trombley, Ann Arbor, MI (US); Aleksey Shepelev, San Jose, CA (US); Chen Zhang, South Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 16/190,419

(22) Filed: Nov. 14, 2018

(65) Prior Publication Data

US 2020/0148257 A1    May 14, 2020

(51) Int. Cl.
  *B62D 13/06*    (2006.01)
  *B62D 15/02*    (2006.01)
  *B60W 50/14*    (2020.01)

(52) U.S. Cl.
  CPC ......... *B62D 13/06* (2013.01); *B62D 15/0295* (2013.01); *B60W 50/14* (2013.01); *B60W 2050/146* (2013.01); *B62D 15/027* (2013.01)

(58) Field of Classification Search
  None
  See application file for complete search history.

(56) References Cited

U.S. PATENT DOCUMENTS

| | | | |
|---|---|---|---|
| 9,804,278 B2 | 10/2017 | Benz et al. | |
| 10,780,752 B1* | 9/2020 | Niewiadomski | B60R 1/00 |
| 2005/0074143 A1* | 4/2005 | Kawai | B62D 13/06 |
| | | | 382/104 |
| 2006/0038381 A1* | 2/2006 | Gehring | B60D 1/36 |
| | | | 280/477 |
| 2009/0236825 A1* | 9/2009 | Okuda | B60D 1/36 |
| | | | 280/477 |
| 2010/0096203 A1* | 4/2010 | Freese, V | B60D 1/58 |
| | | | 180/167 |
| 2010/0324770 A1* | 12/2010 | Ramsey | B60D 1/36 |
| | | | 701/25 |
| 2011/0043633 A1* | 2/2011 | Sarioglu | G01S 5/16 |
| | | | 348/148 |
| 2013/0226390 A1* | 8/2013 | Luo | B60D 1/36 |
| | | | 701/25 |
| 2014/0012465 A1* | 1/2014 | Shank | B62D 15/0285 |
| | | | 701/36 |
| 2014/0249691 A1* | 9/2014 | Hafner | B62D 15/0275 |
| | | | 701/1 |
| 2016/0096549 A1 | 4/2016 | Herzog et al. | |
| 2017/0123431 A1* | 5/2017 | Ghneim | B60W 10/184 |
| 2017/0361836 A1* | 12/2017 | Lavoie | B60R 1/00 |
| 2018/0039266 A1* | 2/2018 | Dotzler | B60D 1/62 |
| 2018/0147900 A1* | 5/2018 | Shank | B60R 25/25 |
| 2020/0324593 A1* | 10/2020 | Niewiadomski | B62D 15/0285 |

* cited by examiner

*Primary Examiner* — Thomas E Worden
(74) *Attorney, Agent, or Firm* — Raymond Coppiellie; Price Heneveld LLP

(57) ABSTRACT

A driver assistance system for a vehicle having a hitch includes a trailer detection system, a steering system, and a controller. The controller determines that a trailer is not coupled with the hitch and outputs a reverse hitching path control signal to the steering system and determines that the trailer is coupled with the hitch and outputs a trailer backing path control signal to the steering system.

20 Claims, 8 Drawing Sheets

SHARED ACTIVATION BUTTON FOR TRAILER FEATURES

FIELD OF THE DISCLOSURE

The present disclosure generally relates to a system for assisting in a vehicle operations related to connecting with and backing a trailer. In particular, the present system provides a single input device for controls related to both trailer functions.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle hitch assistance system includes a driver assistance system for a vehicle having a hitch includes a trailer detection system, a steering system, and a controller. The controller determines that a trailer is not coupled with the hitch and outputs a reverse hitching path control signal to the steering system and determines that the trailer is coupled with the hitch and outputs a trailer backing path control signal to the steering system.

Embodiments of the first aspect of the invention can include any one or a combination of the following features:
  the trailer detection system may include a vision-based imaging system;
  the controller can determine one of that a trailer is coupled with the hitch or that the trailer is not coupled with the hitch by identifying a tongue of the trailer within an image to the rear of the vehicle and determining the position of the tongue relative to a position of the hitch;
  the controller can determine the position of the tongue relative to a position of the hitch by attempting to locate the hitch within the image to the rear of the vehicle, determining that the trailer is not coupled with the hitch when both the tongue and the hitch are identified in the image, and determine that the trailer is coupled with the hitch when the tongue is identified in the image and the hitch is not identified in the image;
  the controller can use the trailer detection system in deriving the trailer backing path control signal as the trailer backing path control signal is output to the steering system;
  the controller can use the trailer detection system to locate a tongue of the trailer and determine an angle of the trailer relative to the vehicle and can input the angle to a feedback-based scheme for deriving the trailer backing path control signal;
  the controller can use the trailer detection system in deriving the reverse hitching path control signal such that outputting the reverse hitching path control signal aligns a center of the hitch with a coupler of the trailer;
  the controller can further request a user input regarding whether the trailer is coupled or not coupled with the hitch when the controller is unable to determine that the trailer is not coupled with the hitch or that that the trailer is coupled with the hitch;
  the controller can further request the user input by causing a human-machine interface within the vehicle to present a user prompt with at least one selectable item corresponding with a corresponding one of inputting that the trailer is not coupled with the hitch or that that the trailer is coupled with the hitch; and
  the system can further include an input including a rotating element and a button, the controller can use an input from the button as an activation command in connection with a hitching mode that includes outputting the reverse hitching path control signal and a backup assist mode that includes outputting the trailer backing path control signal, and the controller can use an input from the rotatable rotary element as a control signal in connection with the backup assist mode.

According to another aspect of the present disclosure, a vehicle includes a hitch mounted on a rear of the vehicle, a trailer detection system, a steering system, and driver assistance system, including a controller. The controller determines that a trailer is not coupled with the hitch and outputs a reverse hitching path control signal to the steering system and determines that the trailer is coupled with the hitch and outputs a trailer backing path control signal to the steering system.

According to another aspect of the present disclosure, a method for assisting a driver in reversing a vehicle includes using a trailer detection system to determine whether a trailer is coupled or is not coupled a hitch disposed on a rear of the vehicle, outputs a reverse hitching path control signal to a vehicle steering system when the trailer is not coupled with the hitch, and outputs a trailer backing path control signal to the steering system when the trailer is coupled with the hitch.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
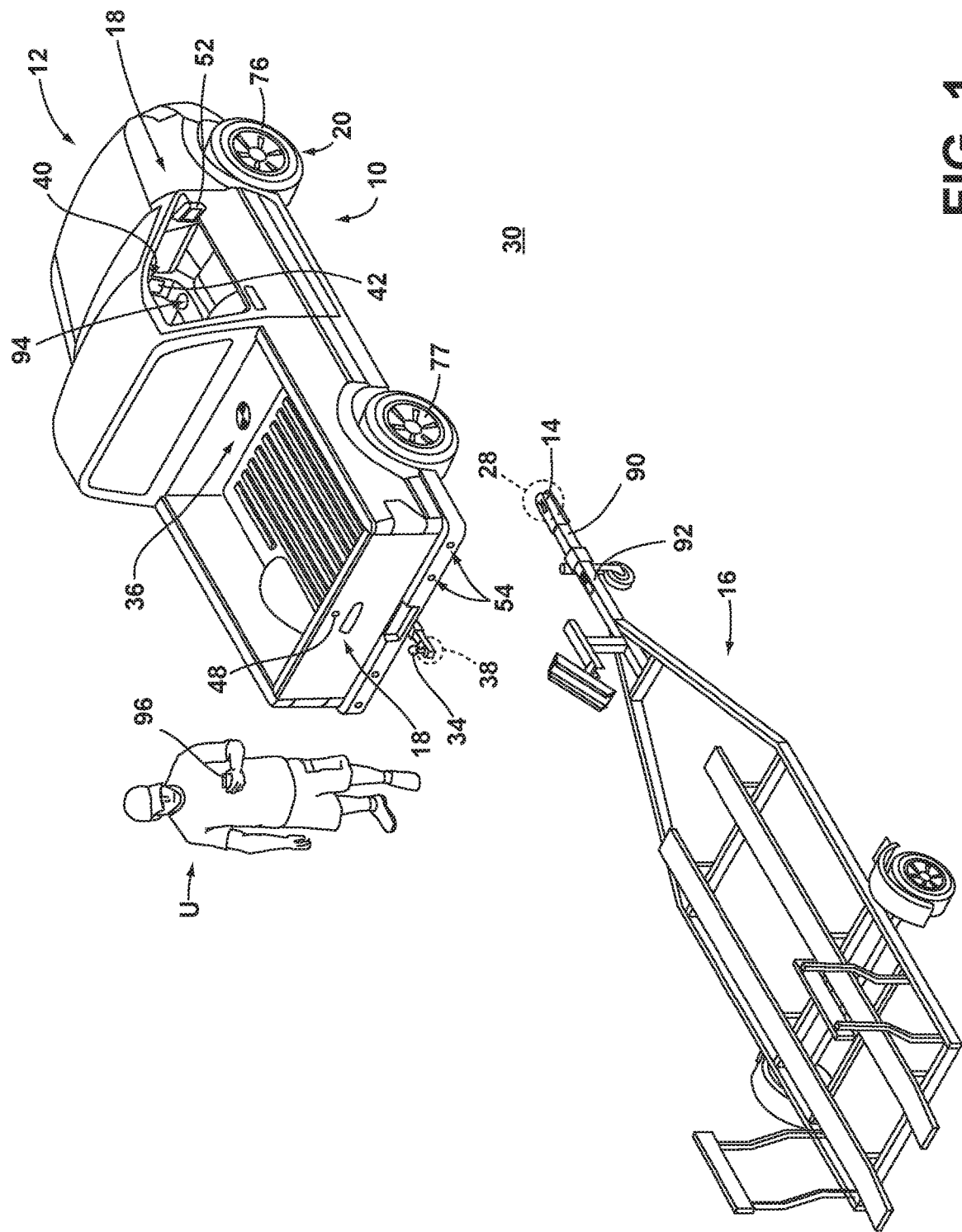
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-11, reference numeral 10 designates a driver assistance system 10 for a vehicle 12 having a trailer hitch 14. The driver assistance system 10 includes a trailer detection system, discussed herein in the exemplary form of a vision-based imaging system 18, a steering system 20, and a controller 26. The controller 26 determines that a trailer 16 is not coupled with the hitch 14 and outputs a reverse hitching path control signal to the steering system 20 and determines that the trailer 16 is coupled with the hitch 14 and outputs a trailer backing path control signal to the steering system 20.

Figure 2:
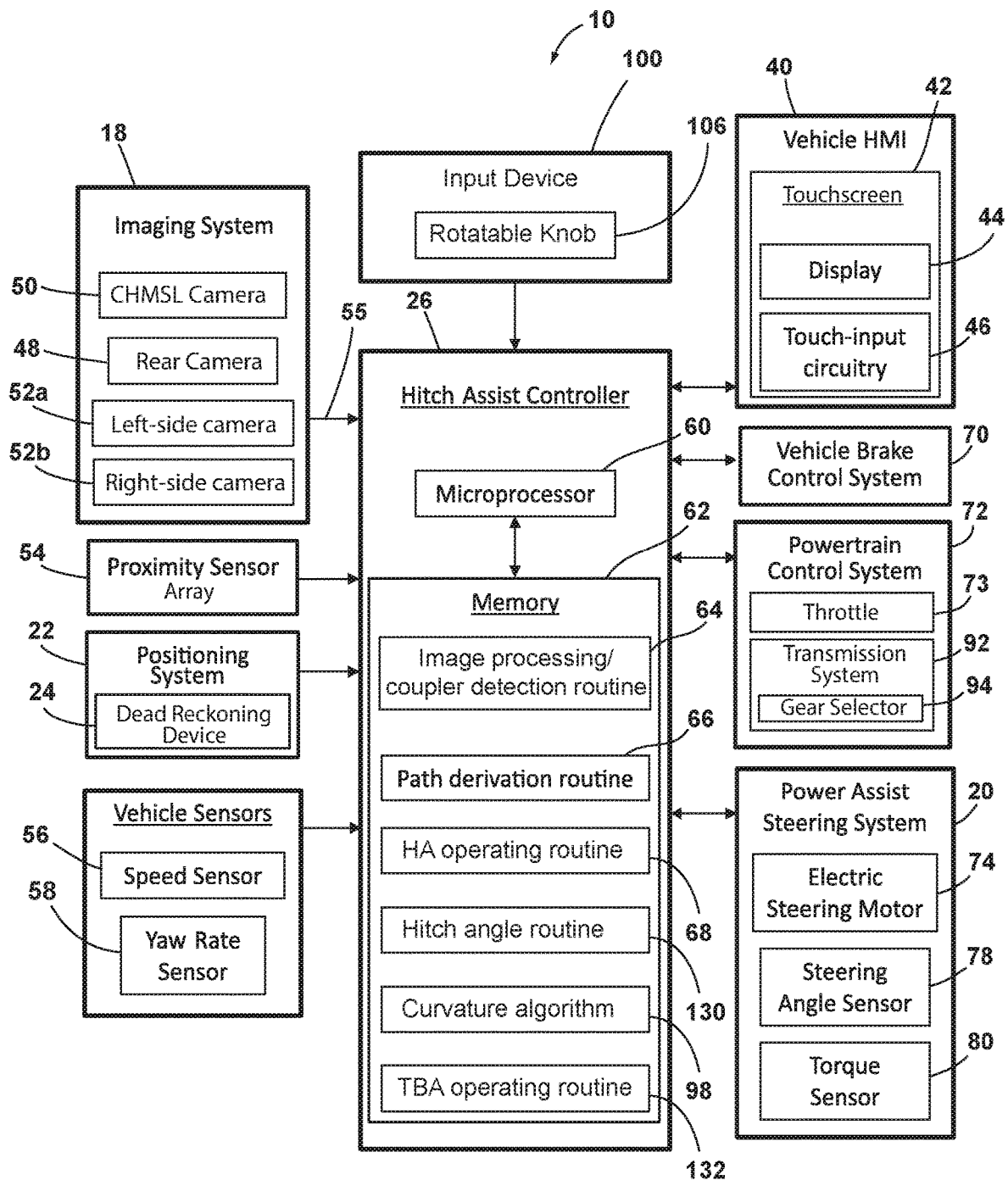
FIG. 2 is a diagram of a system according to an aspect of the disclosure for providing driver-assistance functionality related to the use of a trailer with a corresponding vehicle.

With respect to the general operation of the driver assistance system 10, as illustrated in the system diagram of FIG. 2, system 10 includes various sensors and devices that obtain or otherwise provide vehicle status-related information that is useable to generate and output the reverse hitching path control signal related to hitching assistance functionality of system 10, as well as to generate and output the trailer backing path control signal related to trailer backup assistance functionality of system 10, as discussed further below. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by driver assistance system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the driver assistance system 10 may process with various routines to determine the height H and position (e.g., based on the distance $D_h$ and angle $α_h$) of coupler 14.

As further shown in FIG. 2, one embodiment of the driver assistance system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the driver assistance system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 may be provided on the power assist steering system 20 that senses torque on the steering wheel that is not expected from autonomous control of the steering wheel and therefore indicative of manual intervention, whereby the driver assistance system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
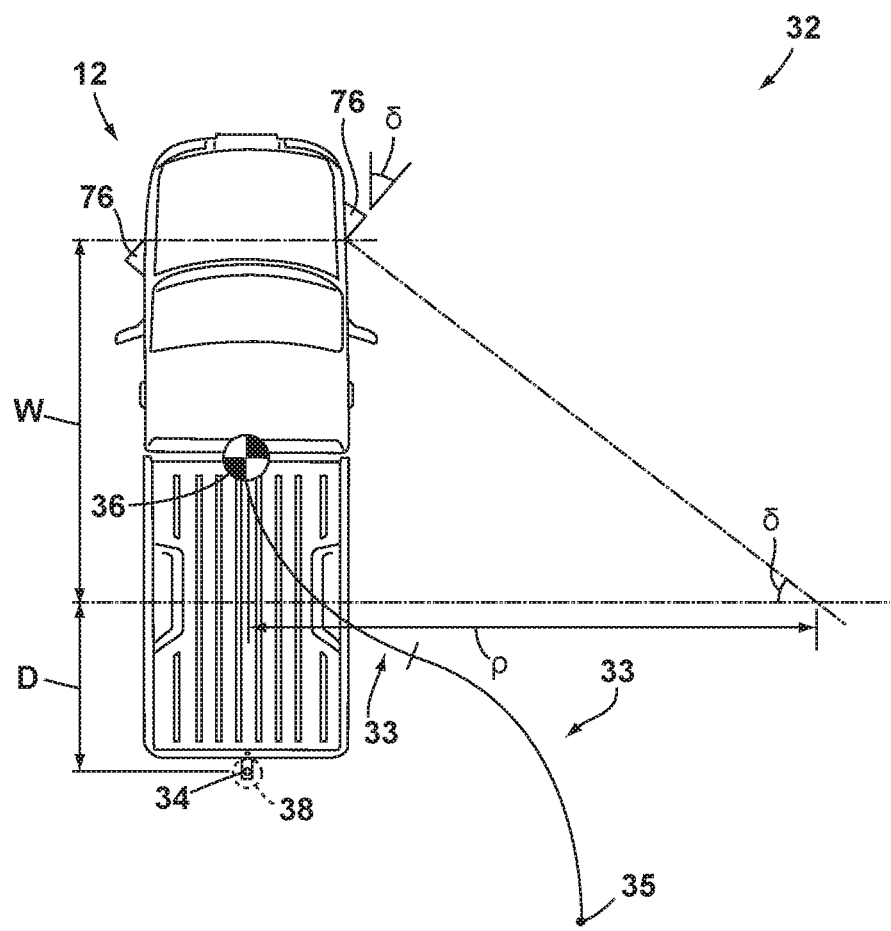
FIG. 3 is an overhead schematic view of a vehicle during a step of an alignment sequence with the trailer.
Figure 3:
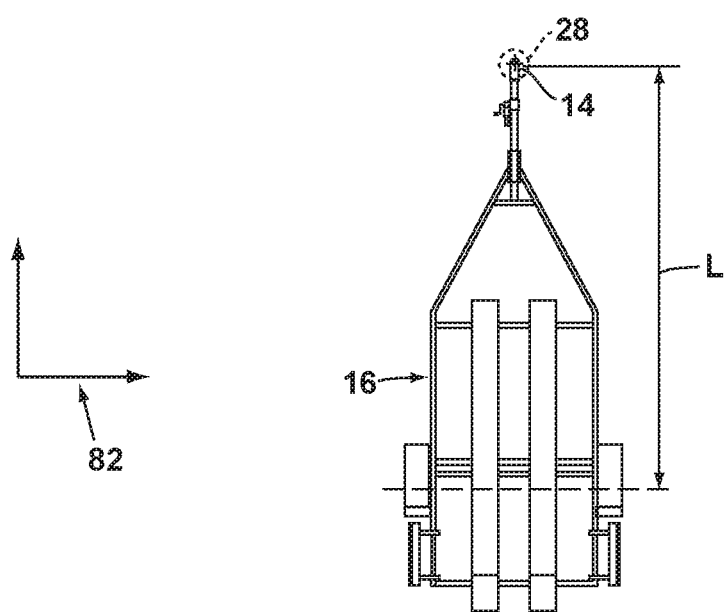

With continued reference to FIG. 2, the power assist steering system 20 provides the controller 26 of the driver assistance system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the driver assistance system 10, in additional embodiments, may be an integrated component of the power assist steering system 20. For example, the power assist steering system 20 may include a hitch assist algorithm and a trailer backup assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the driver assistance system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, as well as using one or more of the cameras 48, 50, 52*a*, 52*b* to track the positions of identifiable ground items or portions over time. In some embodiments, individual wheel speeds can also be used to determine a vehicle yaw rate γ, which can be provided to the driver assistance system 10 in the alternative or in addition to the vehicle yaw rate sensor 58. The driver assistance system 10 can, further, provide vehicle braking information to the brake control system 70 for allowing the driver assistance system 10 to control braking of the vehicle 12 during backing of the trailer 16. For example, the driver assistance system 10, in some embodiments, may regulate speed of the vehicle 12 during alignment of the vehicle 12 with the coupler 14 of trailer 16 (i.e., when implementing hitching assistance functionality), which can reduce the potential for a collision with trailer 16, and can bring vehicle 12 to a complete stop at a determined endpoint 35 of path 32. It is disclosed herein that the driver assistance system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the driver assistance system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the driver assistance system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the driver assistance system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands (i.e., the above-mentioned reverse hitching path control signal and a trailer backing path control signal) as a function of all or a portion of the information received. During the hitching assistance mode, the vehicle steering information and commands may be provided to the power assist steering system 20, during the hitching assistance mode, for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68, as well as a hitch angle routine 130, curvature algorithm 98, and trailer backup assistance operating routine, as discussed further below. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52*a* and 52*b*, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52*a*, 52*b* included in imaging system 18 can be positioned to generally overlap in their respective fields of view, which in the depicted arrangement include fields of view 49, 51, 53*a*, and 53*b* to correspond with rear camera 48, center high-mount stop light (CMHSL) camera 50, and side-view cameras 52*a* and 52*b*, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53*a*, 53*b*, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data 55. In one example, the image processing routine 64 can identify the coupler 14 within the image data 55 based on stored or otherwise known visual characteristics of coupler 14 or hitch couplers in general. In another embodiment, a target 92 in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the target 92 for location in image data 55, as well as the positioning of coupler 14 relative to such a target 92 so that the position 28 of coupler 14 can be determined based on the target 92 location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55. Alternatively, the user can visually determine the position 28 of coupler 14 within an image presented on HMI 40 and can provide a touch input coupler 14 in a manner similar to that which is described in co-pending, commonly-assigned U.S. patent application Ser. No. 15/583,014, the entire disclosure of which is incorporated by reference herein. The image processing routine 64 can then correlate the location of the touch input with the coordinate system 82 applied to image 30.

As shown in FIG. 3, the image processing routine 64 and operating routine 68 may be used in conjunction with each other to determine the path 32 along which driver assistance system 10 can guide vehicle 12 to align hitch ball 34 and coupler 14 of trailer 16. In the example shown, an initial position of vehicle 12 relative to trailer 16 may be such that coupler 14 is only in the field of view 53a of side camera 52a, with vehicle 12 being positioned laterally from trailer 16 but with coupler 14 being almost longitudinally aligned with hitch ball 34. In this manner, upon initiation of driver assistance system 10, such as by user input on touchscreen 42, for example, image processing routine 64 can identify coupler 14 within the image data 55 of camera 52a and estimate the position 28 of coupler 14 14 relative to hitch ball 34 using the image data 55 in accordance with one of the example discussed above (or a combination of the two examples) or by other known means, including by receiving focal length information within image data 55 to determine a distance $D_c$ to coupler 14 and an angle $\alpha_c$ of offset between coupler 14 and the longitudinal axis of vehicle 12. This information can then be used in light of the position 28 of coupler 14 within the field of view of the image data 55 to determine or estimate the height $H_c$ of coupler 14. Once the positioning $D_c$, $\alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a rearward distance to coupler 14 and derive a path 32 that achieves the needed lateral and backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. In further aspects, system 10 can be further configured to shift vehicle 12 between forward-driving gears and the reverse driving gear such that the derivation of path 32 can include both forward and rearward driving of vehicle 12 to achieve the desired lateral movement, as described further in co-pending, commonly-assigned U.S. patent application Ser. No. 15/583,014, the entire contents of which are incorporated by reference herein.

Figure 10:
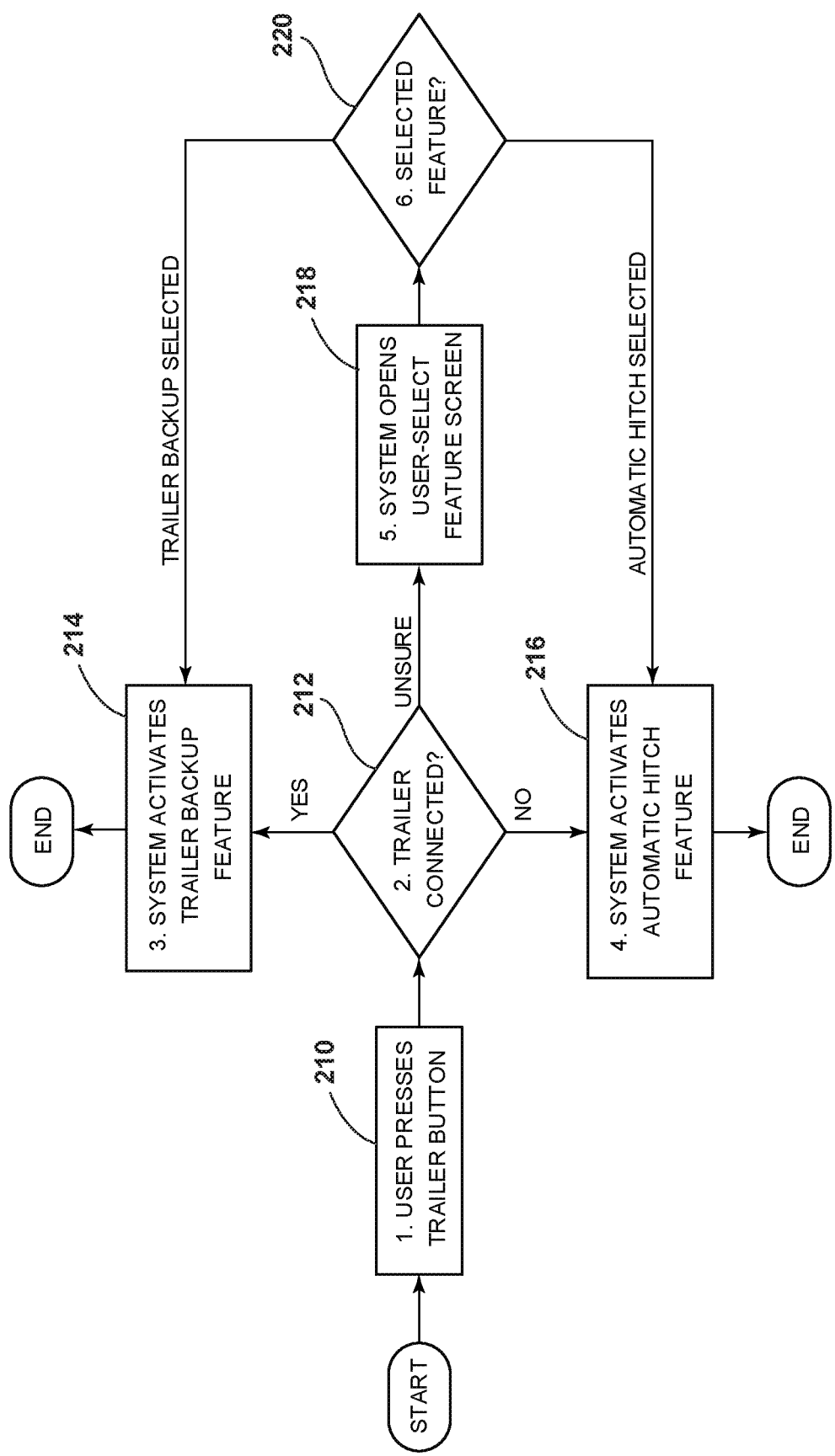
FIG. 10 is a flowchart depicting steps in a sequence for sharing functionality of the rotatable knob and related inputs between hitching assistance and trailer backing assistance functionality of the vehicle and system shown in FIGS. 1 and 2.

Continuing with respect to FIG. 3, once the path 32 including the determination of endpoint 35 has been determined, system 10 controls the reversing of vehicle 12 toward trailer 16 to bring hitch ball 34 closer to alignment with the coupler 14. As vehicle 12 approaches trailer 16, the accuracy of the data relating to the position 28 of coupler 14 may increase, such as by providing clearer image data including coupler 14 by cameras 48, 50, 52a, 52b, and/or by bringing vehicle 12 to a position wherein the proximity sensors 54 can be used to detect the position 28 of coupler 14. In this manner, path routine 66 can continue to operate as vehicle 12 maneuvers along path 32 such that a remaining portion of path 32 (such as the portion of path 32 shown in FIG. 10 compared with the initial path of FIG. 8) can be re-iterated or refined based on the updated position 28 data. As can be appreciated, this can be done continuously or once the vehicle 12 reaches a threshold distance $D_c$ to coupler 14 wherein the proximity sensors 54 can be used. The re-iterated or refined path 32 can include a re-iterated or refined determination of the centerline 102 of coupler 14, which can be used to determine the endpoint 35 of path 32 that corresponds therewith.

Figure 4:
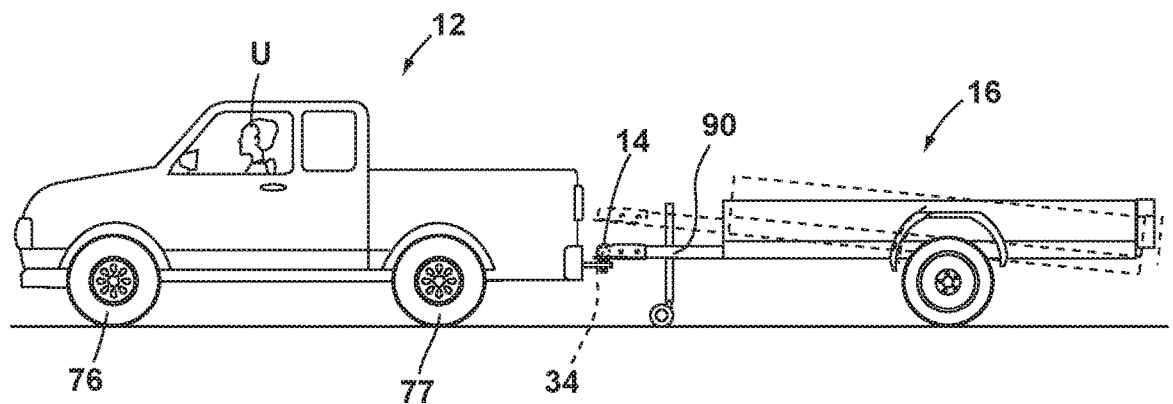
FIG. 4 is a side schematic view showing the trailer in an aligned position for hitching with the vehicle.
Figure 5:
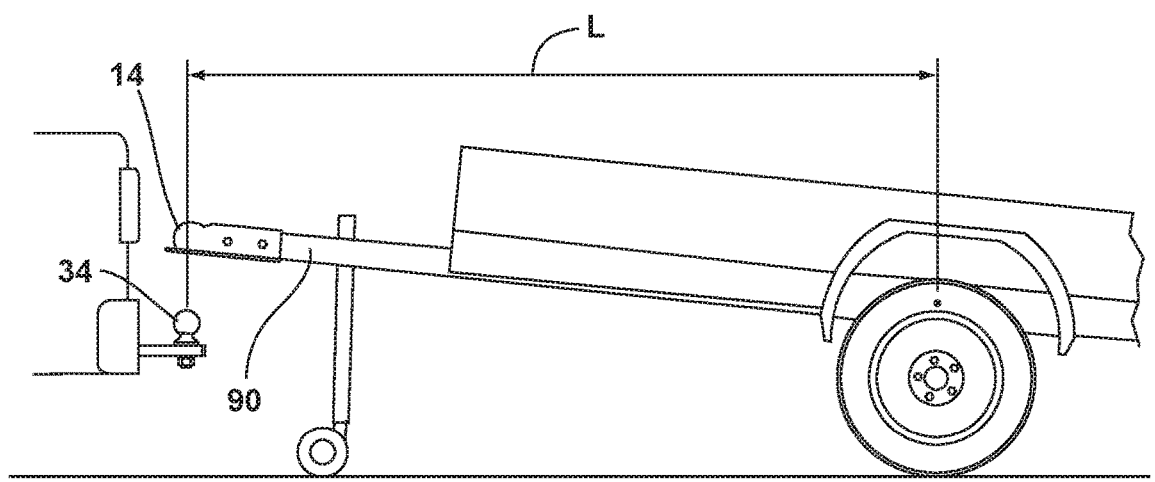
FIG. 5 is a side detail view thereof showing a vehicle in a hitching operation with a trailer requiring downward movement of the trailer coupler.

In one implementation, controller 26 can determine path 32 and endpoint 35, as discussed above, and can control the steering and braking of vehicle 12 (and, further optionally, the powertrain system 72) to control movement of vehicle 12 along path 32 to bring vehicle 12 to endpoint 35 of path 32 in the desired orientation of alignment of hitch ball 34 with coupler 14. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$ while tracking the position $D_c$, $\alpha_c$ of coupler 14 to converge the known relative position of hitch ball 34 to the desired position 110 thereof relative to the tracked position 28 of coupler 14, as shown in FIGS. 4 and 5. Subsequently, system 10 can indicate to the user that the operation is complete and the user can exit the vehicle 12 and lower the coupler 14 into the engaged position over hitch ball 34 and can secure coupler 14 with hitch ball 34 according the particular characteristics of trailer 16.

In at least one application, the capability of system 10 to reverse vehicle 12 to an aligned position with respect to trailer 16, as described herein, can be useful in connection with further capability to assist the driver in reversing trailer 16 with vehicle 12 once trailer 16 has been coupled with vehicle 12 by way of hitch ball 34. In the example discussed above, system 10 is further configured for controlling a backing path of a trailer 16 attached to a vehicle 12 by allowing a driver of the vehicle 12 to specify a desired curvature 126 of the backing path of the trailer 16. System 10 can include an interface 100 having a rotatable knob 106 in communication with controller 26, as shown in FIG. 2 such that controller 26 can operate in a trailer backup assistance mode including interpreting a first instantaneous position of the knob 106 as a trailer control commanding position and generating a vehicle steering command based thereon. In this manner, controller 26 can be adapted with a curvature routine 98, as shown in FIG. 2, and further described in commonly-assigned U.S. Pat. No. 9,102,271, the entire disclosure of which is incorporated by reference herein. In general, the operation of the trailer backup assistance mode within the operation of system 10 involves an input device 100 that includes the above-mentioned rotatable knob 106, for a driver to provide the desired curvature 126 of the combined vehicle 12 and trailer 16. As such, the steering input device 100 may be operable between a plurality of selections, such as successive rotated positions of knob 106, that each provide an incremental change to the desired curvature 126 of the combined trailer 16 and vehicle 12 during reversing. Upon inputting the desired curvature 126, the controller 26 may generate a trailer backing steering command for the vehicle 12 to guide the trailer 16 on the desired curvature 126 based on the estimated hitch angle γ and a kinematic relationship between the trailer 16 and the vehicle 12.

With reference to the embodiment shown in FIG. 1, as described above, the vehicle 12 is a pickup truck embodiment that is equipped with one embodiment of system 10 adapted with the trailer backup assistance functionality for controlling the backing path of the trailer 16 when it is attached to the vehicle 12, such as following a hitching operation, as discussed above. Specifically, the vehicle 12 may be pivotally attached to the illustrated trailer 16 with a tongue 90 longitudinally extending from the remaining portions of trailer 16 with the above-described coupler 14 that latches onto the hitch ball 34 to provide a pivoting ball joint connection that allows for articulation of trailer 16 at a hitch angle γ relative to the longitudinal axis of vehicle 12. Such an implementation of system 10 can use imaging system 18, as discussed above as a vision-based hitch angle sensor for estimating the hitch angle γ between the vehicle 12 and the trailer 16. In a particular example, one of the various cameras 48, 50, 52a, 52b can capture one or more images of the trailer 16, including a region containing one or more desired target placement zones for at least one target 90 to be secured. Although it is contemplated that the imaging system 18 may capture images of the trailer 16 without a target 90 to determine the hitch angle γ, in the illustrated embodiment, trailer 16 includes a target 90 to allow the system 10 to utilize information acquired via image acquisition and processing of the target 90. Other means of determining the hitch angle γ may be possible in various embodiments of system 10.

As discussed above, system 10 is in communication with the power assist steering system 20 of the vehicle 12 to operate the steered wheels 76 (FIG. 1) of the vehicle 12 for moving the vehicle 12 in such a manner that the trailer 16 reacts in accordance with the desired curvature 126 of the trailer 16. In this manner, a trailer backing steering command may be provided by the system 10 for autonomously steering during a backup maneuver. The power assist steering system 20 provides the controller 26 with information relating to a rotational position of steered wheels 76 of the vehicle 12, including a steering angle δ. The controller 26 in the illustrated embodiment processes the current steering angle, in addition to other vehicle 12 and trailer 16 conditions using a feedback-based control scheme (i.e. a P-I control scheme using the equation below) to guide the trailer 16 along the desired curvature 126. It is conceivable that the trailer backup assist system 10, in additional embodiments, may be an integrated component of the power assist steering system 20. For example, the power assist steering system 20 may include a trailer backup assist algorithm for generating vehicle steering information and commands as a function of all or a portion of information received from the steering input device 100, the imaging system 18, the power assist steering system 20, a vehicle brake control system 72, a powertrain control system 74, and other vehicle sensors and devices.

More specifically, the steering input device 100 may provide a selection or positional information that correlates with a desired curvature 126 of the desired backing path of travel of the trailer 16. Also, the trailer steering commands provided by the steering input device 100 can include information relating to a commanded change in the path of travel, such as an incremental change in the desired curvature 126, and information relating to an indication that the trailer 16 is to travel along a path defined by a longitudinal centerline axis of the trailer 16, such as a desired curvature value of zero that defines a substantially straight path of travel for the trailer. As will be discussed below in more detail, the steering input device 100 according to one embodiment may include a movable control input device for allowing a driver of the vehicle 12 to command desired trailer steering actions or otherwise select and alter a desired curvature. For instance, the moveable control input device may be a rotatable knob 106, which can be rotatable about a rotational axis extending through a top surface or face of the knob 106. In other embodiments, the rotatable knob 106 may be rotatable about a rotational axis extending substantially parallel to a top surface or face of the rotatable knob 106. Furthermore, the steering input device 100, according to additional embodiments, may include alternative devices for providing a desired curvature 126 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 100 may also function as an input device for other features, such as providing inputs for other vehicle features or systems.

For a system defined by a vehicle 12 and a trailer 16, a kinematic relationship of the vehicle 12 reversing the trailer 16 is based on various parameters associated with the vehicle 12 and the trailer 16. This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K),$$

where:
- δ: steering angle at steered front wheels of the vehicle;
- α: yaw angle of the vehicle;
- β: yaw angle of the trailer;
- γ: hitch angle (γ=β−α);
- W: wheel base of the vehicle;
- L: drawbar length between hitch point and rear axle of the vehicle;
- D: distance (trailer length) between hitch point and axle of the trailer or effective axle for a multiple axle trailer; and
- $r_2$: curvature radius for the trailer.

For a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 12 and trailer-specific parameters of the kinematic relationship can be inputted by a driver of the vehicle 12, determined from sensed trailer behavior in response to vehicle steering commands, or otherwise determined from signals provided by the trailer 16. Trailer path curvature $\kappa_2$ can be determined from the driver input via the steering input device 100. Through the use of the equation for providing steering angle, a corresponding steering command can be generated by the curvature routine 98 for controlling the power assist steering system 20 of the vehicle 12.

Figure 6:
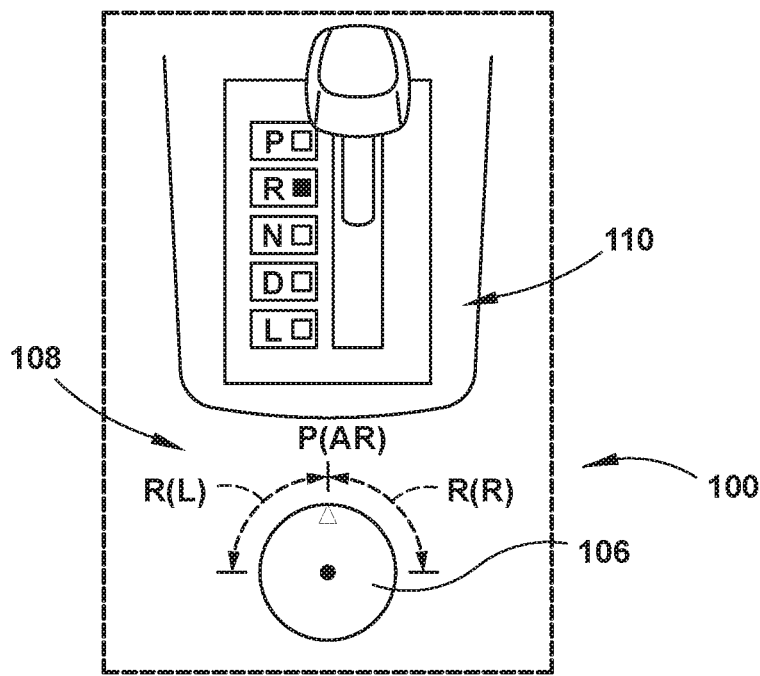
FIG. 6 is a plan view of a steering input device having a rotatable knob for operating the trailer backup assist system, according to one embodiment.
Figure 7:
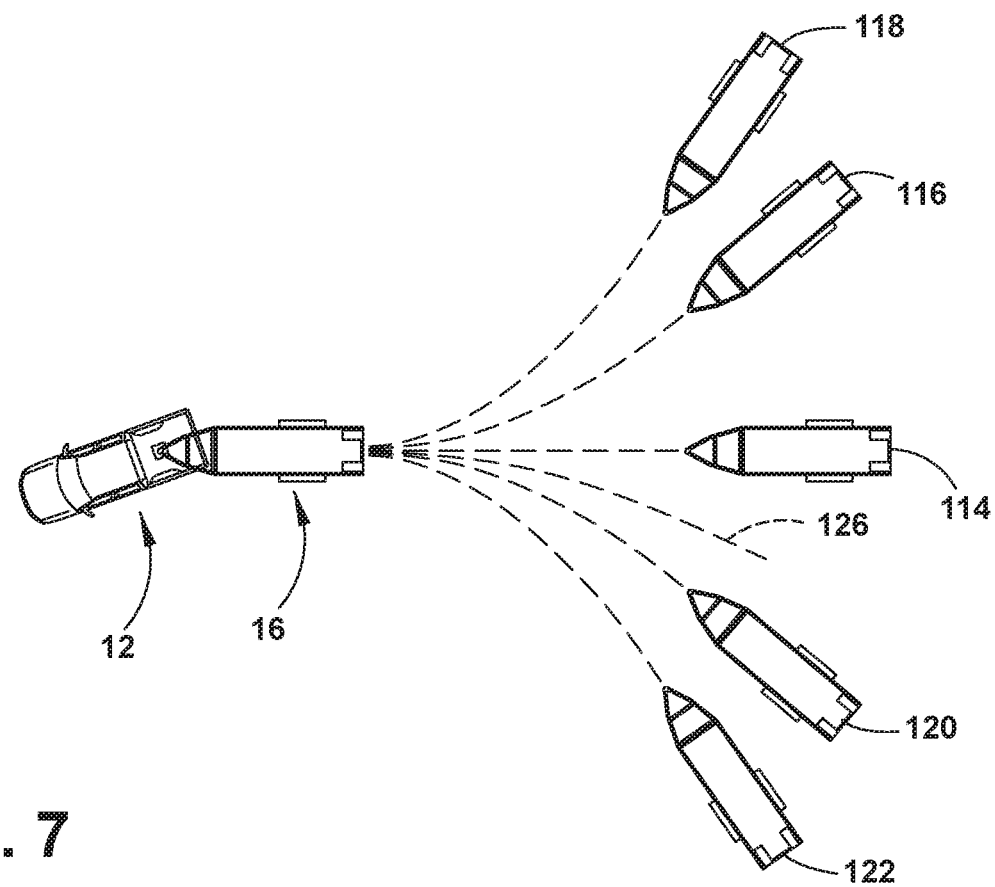
FIG. 7 is a schematic diagram illustrating a vehicle and a trailer with various trailer curvature paths correlating with desired curvatures that may be selected.
Figure 8:
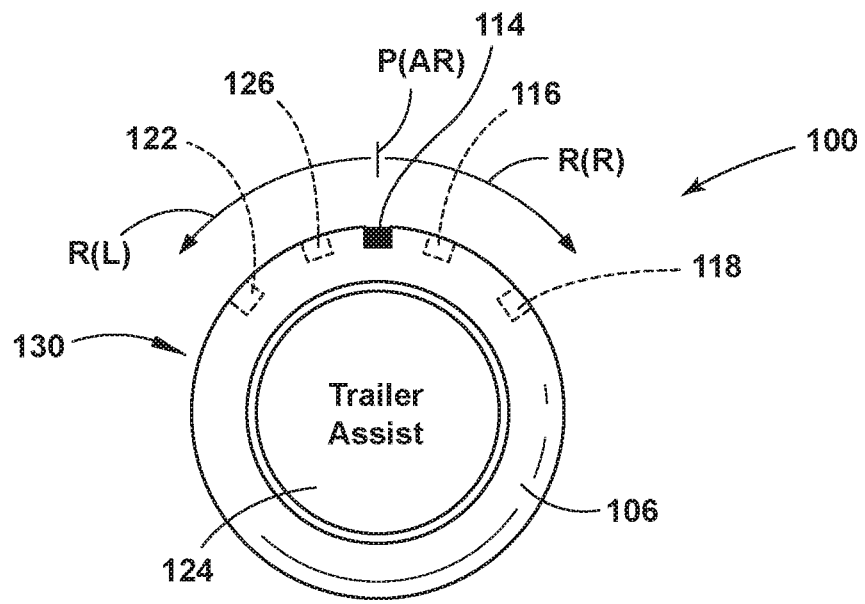
FIG. 8 is a plan view of another embodiment of a rotatable knob for selecting a desired curvature of a trailer corresponding with the schematic diagram of FIG. 7.

The rotatable knob 106, as illustrated in FIGS. 6 and 8, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 106, a torque that biases the knob toward the at-rest position P(AR) can increase (e.g., non-linearly) as a function of the amount of rotation of the rotatable knob 106 with respect to the at-rest position P(AR). Additionally, the rotatable knob 106 can be configured with position indicating detents such that the driver can positively feel the at-rest position P(AR) and feel the ends of the opposing rotational ranges of motion R(L), R(R) approaching (e.g., soft end stops). The rotatable knob 106 may generate a desired curvature value as function of an amount of rotation of the rotatable knob 106 with respect to the at-rest position P(AR) and a direction of movement of the rotatable knob 106 with respect to the at-rest position P(AR), which itself may correspond to a zero-curvature command 126. It is also contemplated that the rate of rotation of the rotatable knob 106 may also be used to determine the desired curvature 126 output to the controller 26. The at-rest position P(AR) of the knob corresponds to a signal indicating that the vehicle 12 should be steered such that the trailer 16 is backed along a substantially straight backing path 114 (FIG. 7) zero trailer curvature request from the driver), as defined by the longitudinal direction of the trailer 16 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 16 that is possible without the corresponding vehicle steering information causing a jackknife condition.

As shown in FIGS. 7 and 8, a driver can turn the rotatable knob 106 to provide a desired curvature 126 while the driver of the vehicle 12 backs the trailer 16. In the illustrated embodiment, the rotatable knob 106 rotates about a central axis between a center or middle position 114 corresponding to a substantially straight backing path 114 of travel, as defined by the longitudinal direction of the trailer 16, and various rotated positions 116, 118, 120, 122 on opposing sides of the middle position 114, commanding a desired curvature 126 corresponding to a radius of the desired backing path of travel for the trailer 16 at the commanded rotated position. It is contemplated that the rotatable knob 106 may be configured in accordance with embodiments of the disclosed subject matter and omit a means for being biased to an at-rest position P(AR) between opposing rotational ranges of motion. Lack of such biasing may allow a current rotational position of the rotatable knob 106 to be maintained until the rotational control input device is manually moved to a different position.

Figure 9:
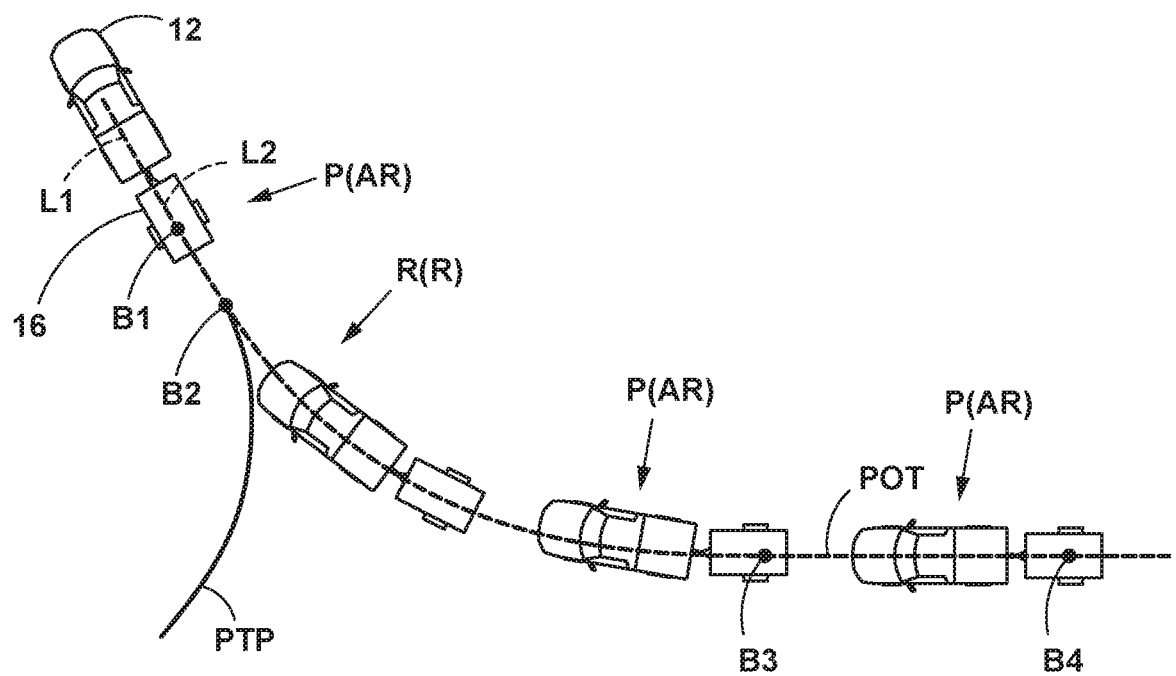
FIG. 9 is a schematic diagram showing a backup sequence of a vehicle and a trailer implementing various curvature selections with the trailer backup assist system, according to one embodiment.

Additionally referring to FIG. 9, an example of using the steering input device 100 for dictating a curvature of a desired backing path of travel (POT) of the trailer 16 while backing up the trailer 16 with the vehicle 12 is shown. In preparation of backing the trailer 16, the driver of the vehicle 12 may drive the vehicle 12 forward along a pull-thru path (PTP) to position the vehicle 12 and trailer 16 at a first backup position B1. In the first backup position B1, the vehicle 12 and trailer 16 are longitudinally aligned with each other such that a longitudinal centerline axis L1 of the vehicle 12 is aligned with (e.g., parallel with or coincidental with) a longitudinal centerline axis L2 of the trailer 16. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 16 by reversing the vehicle 12 from the first backup position B1. So long as the rotatable knob 106 of the trailer backup steering input device 100 remains in the at-rest position P(AR) and no other steering input devices are activated, the trailer backup assist system 10 will steer the vehicle 12 as necessary for causing the trailer 16 to be backed along a substantially straight path of travel, as defined by the longitudinal direction of the trailer 16, specifically the centerline axis L2 of the trailer 16, at the time when backing of the trailer 16 began. When the trailer 16 reaches the second backup position B2, the driver rotates the rotatable knob 106 to command the trailer 16 to be steered to the right (i.e., a knob position R(R) clockwise rotation). Accordingly, the system 10 will steer the vehicle 12 for causing the trailer 16 to be steered to the right as a function of an amount of rotation of the rotatable knob 106 with respect to the at-rest position P(AR), a rate movement of the knob, and/or a direction of movement of the knob with respect to the at-rest position P(AR). Similarly, the trailer 16 can be commanded to steer to the left by rotating the rotatable knob 106 to the left. When the trailer 16 reaches backup position B3, the driver allows the rotatable knob 106 to return to the at-rest position P(AR) thereby causing the system 10 to steer the vehicle 12 as necessary for causing the trailer 16 to be backed along a substantially straight path of travel as defined by the longitudinal centerline axis L2 of the trailer 16 at the time when the rotatable knob 106 was returned to the at-rest position P(AR). Thereafter, the system 10 steers the vehicle 12 as necessary for causing the trailer 16 to be backed along this substantially straight path to the fourth backup position B4. In this regard, arcuate portions of a path of travel POT of the trailer 16 are dictated by rotation of the rotatable knob 106 and straight portions of the path of travel POT are dictated by an orientation of the centerline longitudinal axis L2 of the trailer 16 when the knob 106 is in/returned to the at-rest position P(AR).

Because system 10, as described herein, includes both the hitching assistance and trailer backup assistance functionality, with the trailer backup assistance functionality incorporating input device 100, system 10 can be further adapted to share at least some of the use and/or functionality of input device 100 between the associated hitching assistance and trailer backup assistance modes. Notably, because the two functionalities of system 10 are used in mutually-exclusive scenarios, relevant functionality of input device 100 can be dedicated to whichever system functionality is associated with the state of the vehicle 12 relative to trailer 16. To that end, system 10 can be configured to determine the relevant functionality to execute and/or utilize based on the condition of the vehicle 12 and trailer 16 combination. In an embodiment, system 10 can use the button 124 included in input device 100 as an initiation or activation button for the relevant functionality. In particular, as illustrated in the flowchart of FIG. 10, system 10 can remain idle until a user presses button 124 (step 210), at which point, system 10 can determine 212 the relevant functionality for activation. In particular, system 10 can determine whether there is a trailer 16 connected with vehicle 12 or not. As shown, if a trailer 16 is determined to be connected with vehicle 12, system 10 can activate 214 the trailer backup assistance functionality and operate as described above to assist the user in reversing the trailer 16 along the desired path by using the position of knob 106 as a curvature input in executing curvature routine 98. As discussed above, the driver may command the trailer backing path by using a steering input device 100 and the controller 26 may determine the vehicle steering angle to achieve the desired curvature 126, whereby the driver controls the throttle and brake while the system 10 controls the steering.

Alternatively, if system 10 detects that a trailer 16 is not coupled with vehicle 12, system 10 can interpret the signal from button 124 as an indication to activate the hitching assistance functionality and can, therefore, activate 216 the hitching assist functionality, as discussed above. In this manner, at least the button 124 associated with input device 100 may be useable in connection with both functionalities of system 10. In further aspects, knob 106 may be useable to select among various options during operation of the hitching assistance functionality, such as by moving a curser or other graphical indication of a selected one of multiple identified trailers 12 identified during the hitch detection routine 64 in a rotation direction of knob 106 and to an extent (i.e. half-way rotation for selection of a first trailer 16 to the right of a selected trailer and full rotation for selection of a second trailer 16 to the right). Other selections or navigation relevant to the particular implementation of the hitching assistance functionality may be similarly controlled by knob 106 in connection therewith. By sharing knob 106 in this manner, the use and inclusion of another input within vehicle 12 is obviated, which may help to facilitate clarity of operation to the driver, while maintaining the overall arrangement of controls within vehicle 12 at an acceptably un-cluttered level.

Figure 11:
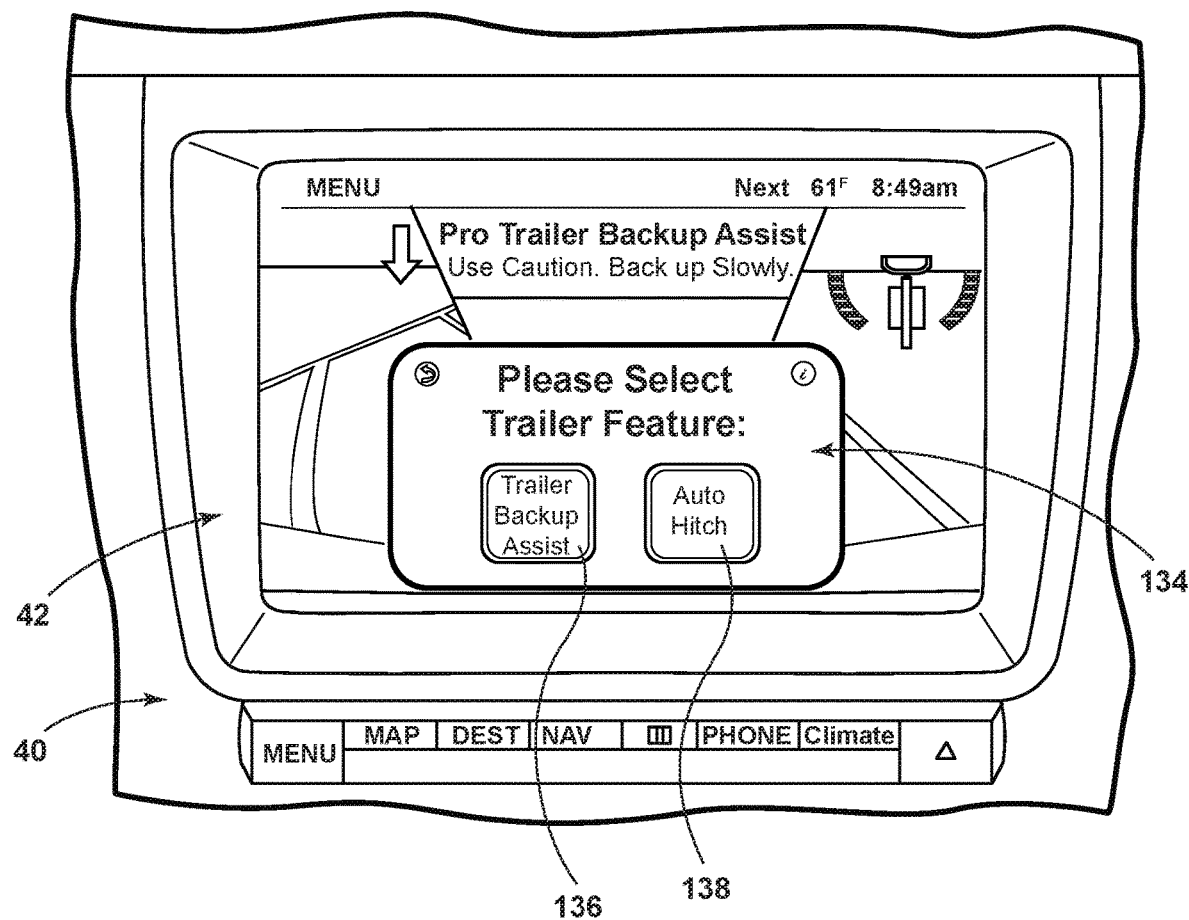
FIG. 11 is a front elevation view of a human-machine interface including a prompt for a driver of the vehicle to select functionality of the system.

As further shown in FIG. 10, in certain situations, discussed further below, system 10 may be unable to determine whether or not a trailer 16 is connected with vehicle 12. In such a situation, system 10 may prompt 218 the driver/user to select the particular feature/functionality to initiate. As shown in FIG. 11, this can be done by presenting a message 134 on HMI 40, for example, indicating that the user should select the desired trailer assistance feature. Message 134 can, thusly, include a selectable item 134, 136 corresponding with each of the trailer backup assistance functionality and the trailer hitching assistance functionality, respectively. The user can select the desired one of the items 134,136 by various means in accordance with the type of display 44 in HMI 40. In one example, display 44 can be included in a touchscreen 42 whereby the user can press on touchscreen 42 in the area of the particular item 134,136 to make the desired selection. In another example, the user can turn knob 106 in the direction of the desired item 134,136, which is then highlighted, before pressing button 240 to confirm the selection. When the selection 220 is made, system 10 can proceed to activate 214, 216 the desired functionality of system 10 corresponding with the selection.

In one implementation of system 10, the above-described vision-based imaging system 18 can be used by system during the step 212 of determining whether or not a trailer 16 is connected with vehicle 12. In this manner, the imaging system 18 can operate in conjunction with appropriate functionality of controller 26 to operate as the above-mentioned trailer detection system. In particular, the imaging system 18, including rear camera 48, for example, can be used by system 10 to search for and identify a trailer tongue 90 in the image data associated with camera 48. As can be appreciated, such identification can be performed using an image processing algorithm or the like and may be a modification of a similar algorithm used by system in the above-described steps of identifying a trailer 16 and coupler 14 during the image processing routine 64 associated with the hitching assistance functionality. Similarly, system 10 may be adapted to identify and monitor a tongue 90 of a trailer 16 during the above-described determination of hitch angle γ, where the tongue may be identified by the presence of a sticker or other target 92 thereon or by other means, including similar image processing to that which may be used in the coupler detection routine 64, discussed above. Additionally, system 10 may be configured to search for and identify the hitch ball 34 extending from the rear of vehicle 12. Again, such functionality may be associated with the operation of system 10 in connection with the hitching assistance functionality, whereby such identification may be useful in comparing the relative heights of hitch ball 34 and coupler 14 or at least in the final stages of a hitching operation to ensure vertical alignment between the hitch ball 34 and the coupler. In this manner, system 10 may leverage such functionality (or add it, when not otherwise available) to determine whether or not a trailer 16 is coupled with vehicle 12 by searching for a trailer tongue 90 in a position overlapping the hitch ball 34, in which condition, system 10 will detect the trailer tongue 90 in a location sufficiently adjacent the rear of vehicle 12 and will, further not be able to detect hitch ball 34. It should be noted that other potential means of detecting a connected trailer, such as the presence of an electrical connection on the trailer electrical connector on the vehicle's rear bumper may be used. Such means, however, may be less reliable than the above-described use of imaging system 18. For example, an auxiliary device might be plugged into this connector instead of a trailer, or conversely, a trailer may be physical hitched but without an electrical connection made. Because of this, use by system 10 of vision processing for the trailer state determination may be preferred.

As can be appreciated, the image processing algorithms employed by system 10 in using vision system 18 to determine whether or not a trailer 16 is coupled with vehicle 12 may not always be completely accurate. To that end, such image processing algorithms often assign a percentage-based certainty level to the outcomes that they produce. In general the certainty level may be impacted by ambient conditions, such as due to the available lighting or weather conditions. Further, due to the positioning of a trailer 16 relative to vehicle 12, a portion of hitch ball 34 may be identified by system 10, leading to an insufficient determination of whether or not the trailer 16 is hitched with the vehicle 12 or if coupler 14 is merely positioned over hitch 14. In this manner system 10 can be configured to receive the certainty level with respect to the image processing algorithms and to use such information in determining whether to rely on the outcome of the algorithms or not. For example, system 10, upon receiving the results of the image processing algorithm(s) indicating either that a trailer 16 is coupled with trailer 14 (trailer tongue identified, but no hitch identified) or that no trailer 16 is coupled with trailer 14 (trailer tongue and hitch ball identified) system 10 can assess the accuracy data of both results to determine if an acceptable level of accuracy is present for one or both of the results. For example, system 10 can require that both results, or an aggregate value of both results, be above a predetermined threshold of certainty (e.g., between about 75% and about 90%, and in one example about 85%) before directly initiating 214, 216 the corresponding functionality of system 10. If the required certainty threshold is not met, then system 10 can proceed to the prompting step 220 to receive user confirmation of the desired functionality to be activated.

In one example, a user can begin the use of system 10 in a position, such as that shown in FIGS. 1 and 3, wherein trailer 16 is positioned in the general area of vehicle 12 but is not coupled therewith. The driver can then depress button 124 to activate system 10, which then confirms that trailer 16 is not coupled with vehicle 12 (such as by using imaging system 18, as discussed above) and activates the hitching assistance functionality, using the trailer detection routine 64, path derivation routine 66, and operating routine 68 to guide vehicle 12 into the position wherein hitch ball 34 is appropriately aligned with coupler 14. When such a point has been reached, system 10 can indicate to the user that the hitching assistance operation is complete and that trailer 16 can be lowered into an engaged position with hitch ball 34.

In an instance wherein, after completion of the hitching operation is complete and the user wishes to reverse the trailer 16 using vehicle 12, the user can again push button 124 and system 10 can confirm that trailer 16 is coupled with vehicle 12 (again, by using imaging system 18, as discussed above, for example) before activating the trailer backup assistance functionality, including the use of hitch angle estimation routine 130, operating routine 132, and curvature routine 98, until the user terminates such operation. In other examples, use of the system can begin with trailer 16 already coupled with vehicle 12 or can be such that the hitching assistance functionality is used to help couple trailer 16 with vehicle 12 for forward driving thereof, with the trailer backup assistance functionality being used, if at all, after an intervening time interval.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A driver assistance system for a vehicle having a hitch, comprising:
    a trailer detection system;
    a steering system; and
    a controller configured to:
        receive a trailer function activation input configured as a single input to selectively initiate both a hitch assistance operating routine and a trailer backup assistance routine;
        locate a trailer within data received from the trailer detection system;
        determine whether the trailer is coupled with the hitch or is uncoupled from the hitch using the trailer detection system when the controller receives the trailer function activation input; and one of:
            in response to determining that the trailer is uncoupled from the hitch when the controller receives the trailer function activation input, execute the hitch assistance operating routine, including outputting a reverse hitching path control signal to the steering system, the reverse hitching path control signal causing the vehicle to maneuver during reversing to align the hitch with a coupler of the trailer; or
            in response to determining that the trailer is coupled with the hitch when the controller receives the trailer function activation input, execute the trailer backup assistance routine, including outputting a trailer backing path control signal to the steering system, the trailer backing path control signal causing the steering system to maneuver the vehicle to maintain the vehicle and the trailer on a specified path during reversing of the vehicle and the trailer.

2. The system of claim 1, wherein the trailer detection system includes a vision-based imaging system.

3. The system of claim 2, wherein the controller is further configured to:
    determine that the trailer is not coupled with the hitch by identifying a tongue position of a tongue of the trailer within an image of the rear of the vehicle relative to a hitch position of the hitch.

4. The system of claim 2, wherein the controller is further configured to determine that the trailer is coupled with the hitch when a tongue of the trailer is identified in an image of the rear of the vehicle and the hitch is not identified in the image.

5. The system of claim 2, wherein the controller is further configured to use the trailer detection system in deriving the trailer backing path control signal as the trailer backing path control signal is output to the steering system.

6. The system of claim 5, wherein the controller is further configured to use the trailer detection system to locate a tongue of the trailer and determine an angle of the trailer relative to the vehicle and inputs the angle into a feedback-based algorithm for deriving the trailer backing path control signal.

7. The system of claim 2, wherein the controller is further configured to use the trailer detection system in deriving the reverse hitching path control signal such that outputting the reverse hitching path control signal aligns a center of the hitch with the coupler of the trailer.

8. The system of claim 1, wherein the controller is further configured to:
    require that determining whether the trailer is coupled with the hitch or is uncoupled from the hitch be completed within a predetermined time interval or to a predetermined confidence level; and
    in response to determining whether the trailer is coupled with the hitch or is uncoupled from the hitch not being completed within either the predetermined time interval or to the predetermined confidence level, request a user input to a human-machine interface within the vehicle regarding whether the trailer is coupled with or uncoupled from the hitch.

9. The system of claim 8, wherein the controller is further configured to request the user input by causing the human-machine interface within the vehicle to present a user prompt with at least one selectable item corresponding with a corresponding one of inputting that the trailer is not coupled with the hitch or that that the trailer is coupled with the hitch.

10. The system of claim 1, wherein the system further includes an input device including a rotatable rotary element and a button, wherein the controller is further configured to:
    use a first input from the button as the trailer function activation input; and
    use a second input from the rotatable rotary element as a control signal in connection with the backup assist mode.

11. The system of claim 1, wherein the trailer function activation input is a first trailer function activation input, the controller being further configured to:
    to execute only one of the hitch assistance operating routine or the trailer backup assistance routine subsequent to receiving the first trailer function activation input; and
    determine whether the trailer is coupled with the hitch or is uncoupled from the hitch, in response to receiving a second trailer function activation input.

12. The system of claim 11, wherein the controller is further configured to:

subsequent to receiving the second trailer function activation input, one of:

in response to determining that the trailer is not coupled with the hitch, execute the hitch assistance operating routine, including outputting the reverse hitching path control signal to the steering system, the reverse hitching path control signal causing the vehicle to maneuver during reversing to align the hitch with the coupler of the trailer; or in response to determining that the trailer is coupled with the hitch, execute the trailer backup assistance routine, including outputting the trailer backing path control signal to the steering system, the trailer backing path control signal causing the steering system to maneuver the vehicle to maintain the vehicle and the trailer on the specified path during reversing of the vehicle and the trailer.

13. A vehicle, comprising:
a hitch mounted on a rear of the vehicle;
a trailer detection system;
a steering system; and
driver assistance system, including a controller configured to:
receive a trailer function activation input configured as a single input for selectively activating both a hitch assistance operating routine and a trailer backup assistance routine in a situationally dependent manner;
locate a trailer within data received from the trailer detection system;
determine whether a trailer is coupled with the hitch or is uncoupled from the hitch when the controller receives the trailer function activation input; and one of:

in response to determining that the trailer is not coupled with the hitch when the controller receives the trailer function activation input, execute the hitch assistance operating routine, including outputting a reverse hitching path control signal to the steering system, the reverse hitching path control signal causing the vehicle to maneuver during reversing to align the hitch with a coupler; or in response to determining that the trailer is coupled with the hitch when the controller receives the trailer function activation input, execute the trailer backup assistance routine, including outputting a trailer backing path control signal to the steering system, the trailer backing path control signal causing the steering system to maneuver the vehicle to maintain the vehicle and the trailer on a specified path during reversing of the vehicle and the trailer.

14. The vehicle of claim 13, wherein:
the trailer detection system includes a vision-based imaging system having at least one camera mounted on and directed outwardly to the rear of the vehicle; and
the controller is further configured to:
use the trailer detection system in deriving the trailer backing path control signal as the trailer backing path control signal is output to the steering system; and
use the trailer detection system to locate a tongue of the trailer and determine an angle of the trailer relative to the vehicle and inputs the angle into a feedback-based algorithm for deriving the trailer backing path control signal.

15. The vehicle of claim 13, wherein the vehicle further includes an input device disposed within an interior of the vehicle and having a rotatable rotary element and a button, wherein the controller is further configured to:
use a first input signal from the button as the trailer function activation input; and
use a second input signal from the rotatable rotary element as a control signal for deriving the specified path in connection with the backup assist mode.

16. A method for assisting a driver in reversing a vehicle, comprising:
receiving a trailer function activation input configured as a single input for selectively activating both a hitch assistance operating routine and a trailer backup assistance routine in a situationally dependent manner;
locating a trailer within data received from a trailer detection system;
in response to receiving the trailer function activation input, using a trailer detection system to determine whether the trailer is coupled with or is uncoupled from a hitch disposed on a rear of the vehicle when the trailer function activation input is received; and one of:

in response to determining that the trailer is not coupled with the hitch when the trailer function activation input is received, executing the hitch assistance operating routine, including outputting a reverse hitching path control signal to a vehicle steering system, the reverse hitching path control signal causing the vehicle to maneuver during reversing to align the hitch with a coupler; or in response to determining that the trailer is coupled with the hitch when the trailer function activation input is received, executing the trailer backup assistance routine, including outputting a trailer backing path control signal to the steering system, the trailer backing path control signal causing the steering system to maneuver the vehicle to maintain the vehicle and the trailer on a specified path during reversing of the vehicle and the trailer.

17. The method of claim 16, wherein the steps of (a) receiving the trailer function activation input, (b) determining whether the trailer is coupled with or is uncoupled from the hitch, and either (c) executing the hitch assistance operating routine, or (d) executing the trailer backup assistance routine, are carried out using a controller.

18. The method of claim 16, wherein:
the trailer function activation input is received as a first input signal from a button of an input device disposed within the interior of the vehicle and having a rotatable rotary element and the button; and
a second input signal from the rotatable rotary element is used as a control signal for deriving the specified path in connection with the backup assistance mode.

19. The method of claim 16, wherein:
the trailer function activation input is a first trailer function activation input;
only one of the hitch assistance operating routine or the trailer backup assistance routine is executed subsequent to receiving the first trailer function activation input.

20. The method of claim 19, further including:
receiving a second trailer function activation input;
in response to receiving a second trailer function activation input, determining whether the trailer is coupled with the hitch or is uncoupled from the hitch; and one of:
in response to determining that the trailer is not coupled with the hitch, executing the hitch assistance operating routine, including outputting the reverse hitching path control signal to the steering system, the reverse hitching path control signal causing the vehicle to maneuver during reversing to align the hitch with the coupler of the trailer; or
in response to determining that the trailer is coupled with the hitch, executing the trailer backup assistance routine, including outputting the trailer backing path control signal to the steering system, the trailer backing path control signal causing the steering system to maneuver the vehicle to maintain the vehicle and the trailer on the specified path during reversing of the vehicle and the trailer.

* * * * *